Figure 5:
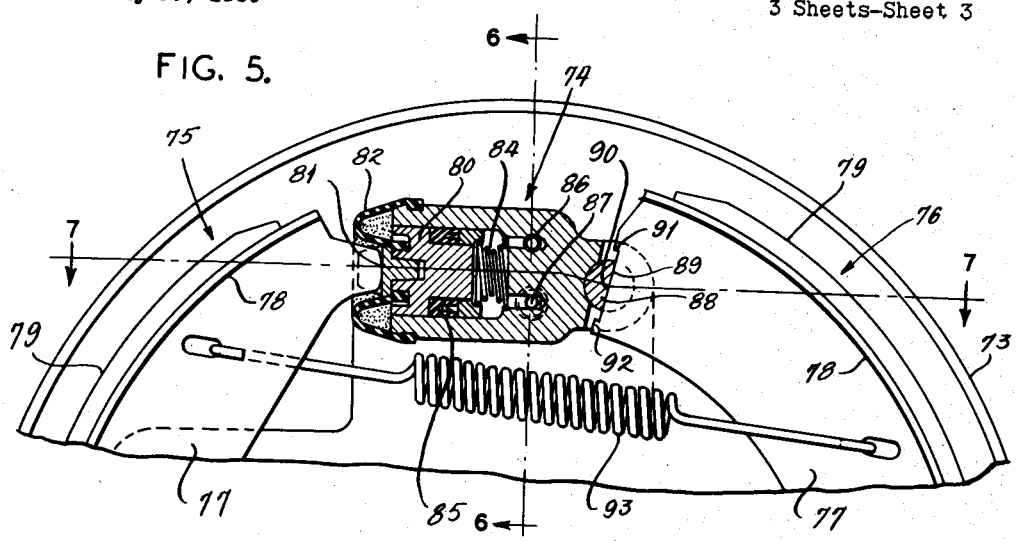

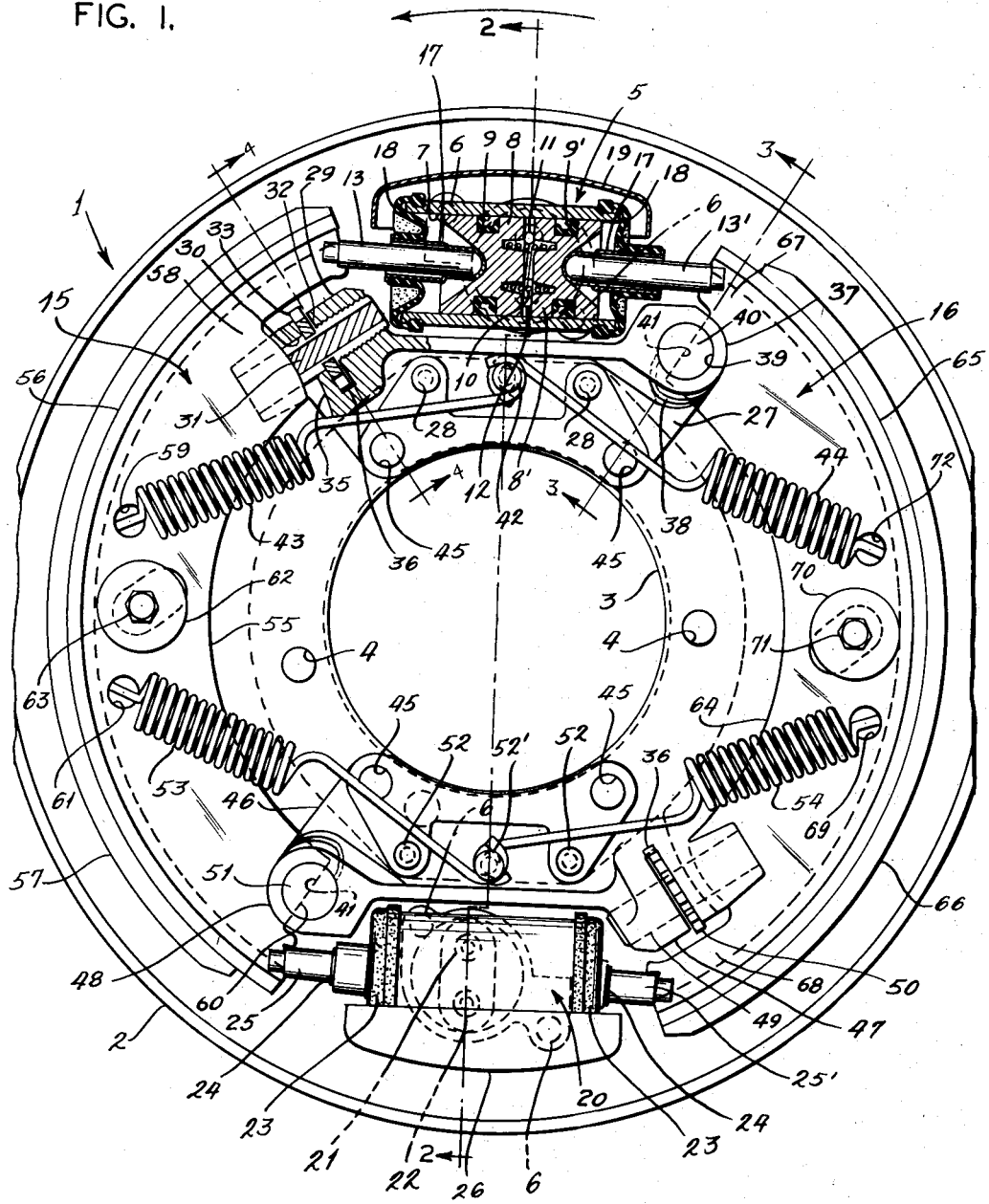

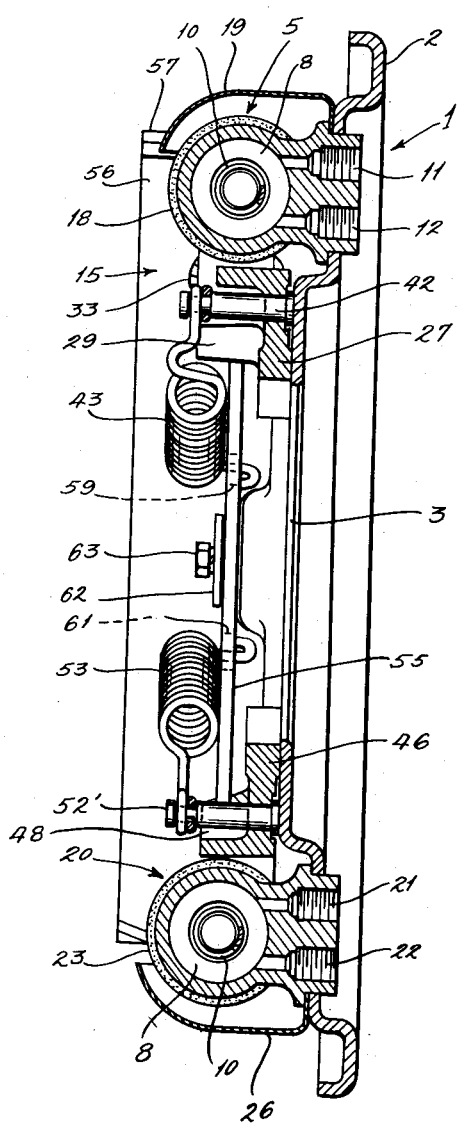
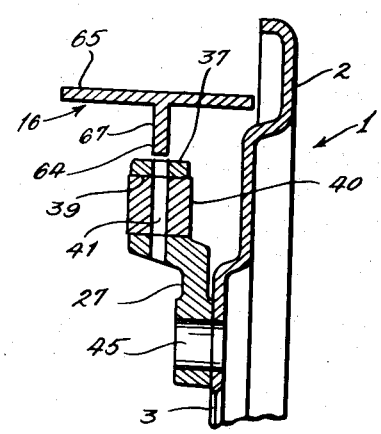
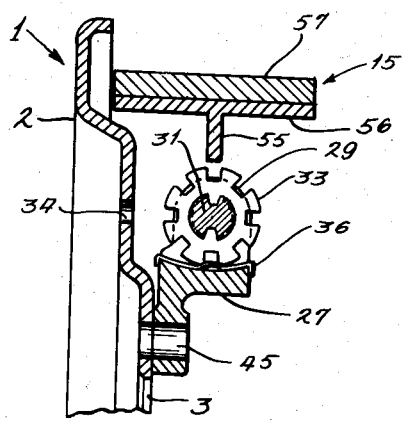

July 5, 1955  S. SCHNELL  2,712,367
ROTATABLE ANCHORING MEANS FOR BRAKES
Filed July 15, 1950  3 Sheets-Sheet 3

INVENTOR.
STEVE SCHNELL
Carr, Carr & Gravely,
ATTORNEYS

United States Patent Office 2,712,367
Patented July 5, 1955

2,712,367
ROTATABLE ANCHORING MEANS FOR BRAKES

Steve Schnell, Kirkwood, Mo., assignor to Wagner Electric Corporation, St. Louis, Mo., a corporation of Delaware Application July 15, 1950, Serial No. 174,000

17 Claims. (Cl. 188—78)

This invention relates to hydraulically-operated braking mechanism for automotive vehicles and is more particularly directed to an improved anchoring method for such mechanism.

The primary object of the invention is to provide brake mechanism having a rotatable brake shoe anchoring means which permits surface contact between the ends of the shoes and the anchoring means.

Another object of the invention is to provide a novel brake shoe anchoring means requiring less anchor surface on the ends of the brake shoe.

A further object of the invention is to provide a brake shoe anchoring means which will allow most of the developed braking torque to be transferred from the brake shoes directly to the flange on the axle or axle housing of the vehicle with only a minimum of the torque being transmitted through the backing plate.

A still further object of the invention is to provide a novel brake shoe anchoring means which will maintain a given contact relationship between the brake shoe and said anchoring means during energization of the brake shoe by the fluid motors.

Another object of the invention is to provide a rotatable type anchor pin having an extended surface contact with a brake shoe and in which the pin is disposed in operative relation with a brake operating motor.

The invention consists in the provision of an anchor pin rotatably mounted in a support secured to the backing plate, the pin having a slot therein at right angles to the longitudinal axis thereof engageable with an extended surface on the web of the brake for providing more reliable brake action.

The invention also consists in the provision of means associated with the backing plate for transmitting to the means on which the backing plate is mounted, a substantial percentage of the thrust developed during braking of the vehicle.

Figure 7:
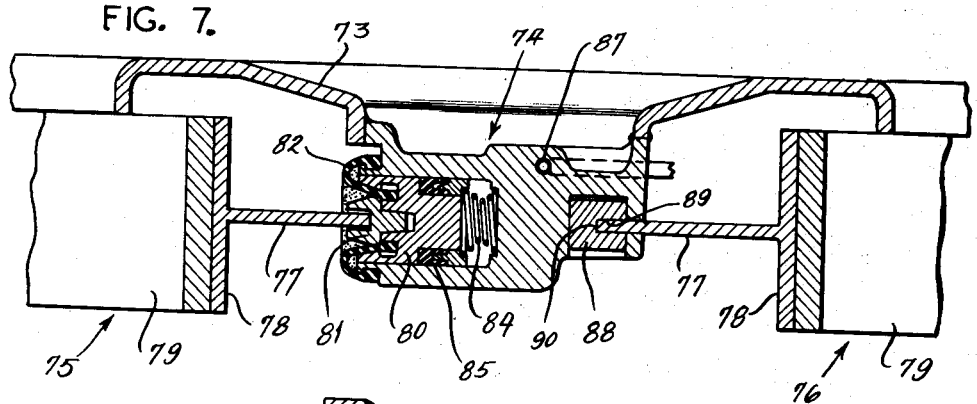
Figure 6:
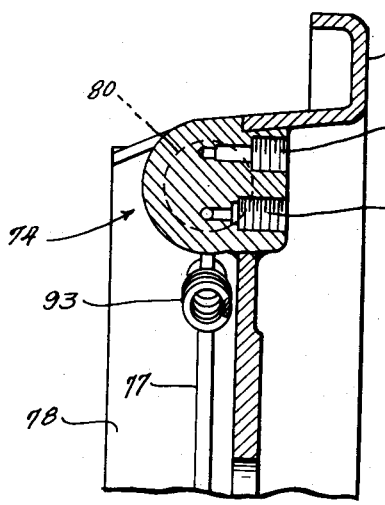

In the drawings:

Fig. 1 is a plan view of a brake mechanism which incorporates the novel features of the invention, Fig. 2 is a sectional view taken along the line 2—2 of Fig. 1, Fig. 3 is a sectional view taken substantially along the line 3—3 of Fig. 1, Fig. 4 is a sectional view taken substantially along the line 4—4 of Fig. 1, Fig. 5 is a partial plan view of a modified form of the invention, Fig. 6 is a sectional view taken substantially along the line 6—6 of Fig. 5; and Fig. 7 is a sectional view taken substantially along the line 7—7 of Fig. 5.

In the drawings the numeral 1 illustrates the brake assembly consisting of a backing plate 2 provided with an aperture 3 through which the axle or structural member of the vehicle upon which the brake assembly is to be mounted, projects. The backing plate is provided with small apertures 4 for attaching the backing plate 2 to the flange (not shown) on the axle or axle housing or structural member of the vehicle. It is assumed that this brake mechanism is to be used on the rear end assembly so that the backing plate will be secured to a flange on the rear axle housing.

Attached to the backing plate 2, near the top, by mounting screws 6, is a fluid motor 5. The fluid motor is provided with a bore 7 having pistons 8 and 8' slidably mounted therein. The pistons are provided with packing cups 9 and 9', respectively, for preventing leakage of liquid past the pistons. A spring 10 is interposed between the pistons 8 and 8' which serves as a means of maintaining a space between the pistons, thus allowing the bleeder port 11 and the brake fluid inlet port 12 to communicate with bore 7 of the fluid motor 5 at all times. The outer ends of pistons 8 and 8' are engaged by push rods 13 and 13', respectively, which serve as the connection between the pistons and the ends of brake shoes 15 and 16 to be described later. Thimbles 17 are fitted over push rods 13 and 13' at the ends adjacent the aforementioned pistons 8 and 8' to serve as heat dissipators. Boots 18 are attached to the other ends of the thimbles 17 and fitted over the open ends of the fluid motor 5, thus preventing the entrance of foreign matter into bore 7 thereof. A spark shield 19 is attached to the backing plate 2, deflecting the sparks caused by the action of the brake shoes 15 and 16 on the brake drum (not shown) away from boots 18, thus increasing their normal life and preventing possible damage to said boots.

Diametrically opposite the fluid motor is a similar fluid motor 20 secured to the backing plate 2 by mounting screws 6. This fluid motor is provided with internal working parts, the same as described in connection with fluid motor 5, and is also provided with a bleeder port 21 and a brake fluid inlet port 22, the latter being suitably connected by a conduit (not shown) to the brake fluid port 12 in the fluid motor 5. The fluid motor 20 is provided with boots 23, the smaller open end of said boots fitting tightly around thimbles 24, as described above, the larger open end fitting over the open ends of the fluid motor 20.

Push rods 25 and 25' are provided for connecting the pistons to the ends of brake shoes 15 and 16, respectively. A spark shield 26 attached to the backing plate 2 is also provided for the purpose of protecting boots 23, of the fluid motor 20, from sparks caused by engagement of the brake shoes 15 and 16 with the brake drum.

Adjacent to and below the fluid motor 5 is a bracket 27 secured to backing plate 2 by studs 28. The bracket 27 is provided with a reinforced projection 29 (Fig. 1) which in turn is provided with a threaded bore 30 for receiving an adjusted screw 31. A slot 32 is cut at right angles to the threaded bore 30 for receiving a star wheel 33 slidably mounted on the adjusting screw 31. The star wheel 33 is rotated by a screw driver inserted in slot 34 (Fig. 4) in the backing plate. The projection 29 is also provided with a slot 35 for receiving the end of the primary shoe 15, thus permitting the end of said shoe to abut against one end of the adjusting screw 31. The star wheel 33 is prevented from undesired movement by a spring 36 (Fig. 4) which functions as a detent. Opposite the projection 29 on bracket 27 and symmetrical thereto, is a projection 37. This projection is provided with a slot 38 for receiving the end of shoe 16 and a bore 39 at right angles thereto wherein a rotatable anchor pin 40 is received. The pin 40 is provided with a slot 41 (Fig. 3) having a flat bottom surface substantially radial to the backing plate when in normal operating position and aligned with slot 38 of projection 37 in order to permit the end of brake shoe 16 to be inserted into slot 38 and aligned with slot 41 in pin 40 and abut against the base thereof. A stud 42 (Figs. 1 and 2) is attached to bracket 27 for securing the ends of return springs 43 and 44, to be described later. The bracket 27 is provided with apertures 45 for allowing said bracket to also be mounted directly on the flange of the axle housing or other structural member of the vehicle.

Diametrically opposite the bracket 27 is an identical bracket 46 provided with projections 47 and 48 corresponding to projections 29 and 37, respectively, on bracket 27. The adjusting screw 49 and star wheel 50, supported by bracket 46, is identical to the adjusting screw 31 and star wheel 33 supported by the upper bracket 27. The lower bracket 46 is provided with a rotatable anchor pin 51 having a slot therein the same as described in connection with the anchor pin 40 supported by bracket 27. The bracket 46 is attached to the backing plate 2 by studs 52. A spring support 52' is carried by bracket 46 for securing the ends of springs 53 and 54, to be described later. Apertures 45 are provided in bracket 46 for attaching it directly to the flange on the axle of the housing or other structural member of the vehicle.

The brake shoe 15 comprises a web 55, and a table 56 thereon supports a friction member 57. The toe 58 of shoe 15 is held in abutting relationship with adjusting screw 31 in bracket 27 and also with the push rod 13 by spring 43 secured in aperture 59 in web 55 of brake shoe 15, its other end being secured to stud 42 on the upper bracket 27. The flat surface 60 of the heel of shoe 15 is held against the flat surface provided at the bottom of the slot in anchor pin 51 and against the push rod 25 by return spring 53 secured in aperture 61 in the web of shoe 15, the opposite end of the spring being connected to spring support 52' in the lower bracket 46. The shoe 15 is slidably supported on the backing plate 2 by a washer 62 and fastening means 63.

The secondary shoe 16 comprises a web 64 and a table 65 which supports the friction member 66. The heel 67 of shoe 16 is held in abutting relationship with anchor pin 40 and pushrod 13' by return spring 44, one end of which is held by stud 42 on bracket 27, the opposite end being secured in an aperture 72 in the web of shoe 16. The toe 68 of shoe 16 is held against the end of the adjusting screw 49 and pushrod 25' of the fluid motor 20 by return spring 54 attached to spring support 52' on the lower bracket 46 at one end thereof, its opposite end being secured in an aperture 69 in web 64 of shoe 16. The shoe 16 is slidably mounted on backing plate 2 and held thereon by washer 70 and fastening means 71.

Having described the component parts of the brake assembly 1, the operation will now be described, assuming that the brake drum (not shown) is turning in the direction of the arrow shown in Fig. 1.

As the operator of the vehicle forces pressure fluid through the fluid ports 12 and 22, the piston 8 in fluid motor 5 is forced to the left and, by reason of its contact with toe 58 of forward shoe 15, the pushrod 13 forces said shoe 15 into engagement with the drum. Since toe 58 of the shoe 15 is moved in the same direction as the rotation of the drum, shoe 15 is self-energized, the resulting forces created between the friction member 57 and the brake drum being transmitted to the rotatable anchor pin 51 carried by bracket 46. Since said bracket is also bolted directly to the flange on the axle housing of the vehicle, most of the braking force transmitted to the anchor pin 51 is transmitted to said bracket 46 and then to the axle housing of the vehicle without passing the forces through the backing plate 2. However, a small portion of the braking force is counteracted by the left-hand piston (not shown) in fluid motor 20 which pushes against the heel of shoe 15 by reason of the fluid pressure in fluid motor 20. It should be noted that as the toe 58 of shoe 15 is moved outwardly into engagement with the drum (not shown), the heel pivots with the rotatable anchor pin 51, no relative movement taking place between the heel of shoe 15 and the anchor pin 51. However, if brake shoe 15 is not properly centered within the drum, or if drum distortion occurs to require self-centering of the brake shoe 15, a slight relative movement will take place between the flat surface on the heel of shoe 15 and the corresponding flat surface on the anchor pin 51.

In a similar manner, the toe 68 of shoe 16 is moved outwardly by pushrod 25' in contact with the right-hand piston (not shown) in the fluid motor 20, and since the toe 68 is moving in the same direction as the rotation of the drum, the shoe 16 is self-energized. Since piston 8' in fluid motor 5 attempts to move heel 67 of shoe 16 outwardly, it counteracts a small portion of the braking force developed in shoe 16. The greater portion of the braking force created within shoe 16 is transmitted to the rotatable anchor pin 40 carried by bracket 27 and, due to the method of securing bracket 27 to the flange on the axle housing of the vehicle, this force is transmitted from the anchor pin to the bracket 27 and on to the axle housing of the vehicle. This procedure permits the use of a backing plate of much lighter gauge material since the backing plate is not required to absorb and transmit large braking forces created within the brake mechanism.

The advantages of the rotatable anchor pins 40 and 51 can now be considered. Since there is no relative movement between the anchor pin and the abutting end of the brake shoes during energization of the shoes, it is possible to increase the contact surface on the ends of said shoes in comparison with the surface required on other self-centering brake mechanisms. If the shoes were to "rock" on the anchor, a greater abutting surface would be necessary to allow for this resulting movement. Furthermore, since there is no relative movement between these contact surfaces, it is much easier to predict and control the operation of the brake shoes during a braking application since the braking forces vary with change in the distance from the center of the backing plate to the anchor point. Thus, for example, experience has shown that by allowing the anchor pin to move nearer the brake drum, there is a resulting decrease in braking forces with a given fluid pressure acting on the pistons of the fluid motors. As the anchor pin moves away from the drum to shorten the distance to the center of the backing plate, there is an increase in braking forces.

Another advantage in the use of a rotatable anchor pin resides in the fact that surface contact is maintained between the anchor pin and the abutting ends of the brake shoes instead of a point contact which would be necessary in the event a stationary anchor were used with a self-centering brake. Consequently, a rounded end on the abutting portions of the brake shoes is required, which results in a line contact between the shoes and the anchor surface. Therefore, in the present instance, by using a flat surface contact, it is not necessary to reinforce the abutting ends of the brake shoes. The self-centering feature is still retained as in other self-centering structures.

During reverse rotation of the drum, which occurs less often than the forward rotation thereof, the operation of the brake mechanism is the same with the exception that the end portion 60 of brake shoe 15 is moved outwardly into engagement with the rotating drum, and the end portion 67 of brake shoe 16 is similarly moved outwardly to contact the drum. The only difference in operation is that the anchor points of the respective shoes are changed to the opposite ends of the brake shoes, the adjusting screws 31 and 49 being the anchor for said shoes. A greater braking force is usually obtained in the forward direction rather than in the reverse direction of the brake drum when employing a given fluid pressure because in the latter case the anchors allow the anchored ends of the shoes to move nearer the drum, which decreases the effective brake input. Furthermore, to compensate for lining wear, shoe adjustments cause the anchor point to move nearer the drum, thereby varying the effective brake input. A reduced braking force is required during reverse rotation of the brake drum which makes the described condition insignificant.

In the event it becomes necessary to compensate for lining wear resulting in a decrease in thickness of the friction members 57 and 66, the supporting shoes may be repositioned with respect to the drum. This involves a simple procedure whereby a tool, such as a screw driver, is inserted into aperture 34 in the backing plate 2 (Fig. 4) for rotating the star wheel 33. Since the star wheel is slidably mounted on the adjusting screw 31, it is apparent that a turning motion of the star wheel will cause an axial movement of said adjusting screw. Thus by rotating the star wheel in the proper direction the adjusting screw is moved downwardly to the left (Fig. 1) to position the shoe nearer the drum. In the same manner, the star wheel 50 and adjusting screw 49 are supported by bracket 46 and will reposition the secondary shoe 16 with respect to the drum.

A modified form of the invention is disclosed in Figs. 5, 6 and 7 in which the numeral 73 designates a backing plate to which a fluid motor 74 is suitably secured as by welding. Brake shoes 75 and 76 are mounted on the backing plate for movement toward and away from a brake drum (not shown). Each of the shoes comprises a web 77 to which a table 78 is secured carrying a lining or friction element 79. The fluid motor has a piston 80 therein which is provided with a wear member 81 engaged by the toe of shoe 75. A boot 82 encloses the open end of the fluid motor, and a spring 84 is interposed between the closed end of the fluid motor and the piston. A packing cup 85 is located in a groove cut in piston 80. The fluid motor is suitably bored and tapped at 86 and 87 to receive fittings for a bleeder and tube for delivering pressure fluid to the fluid motor. The closed extended end of the fluid motor is bifurcated and bored to receive a rotatable anchor pin 88. The anchor pin has a slot 89 milled therein which receives the heel end of the web 77 of shoe 76. This end of the shoe web has a straight edge machined therein which abuts the base of slot 89, the web extending through the bifurcated end of fluid motor 74. The edge 90 is substantially radial to the backing plate 73, as in the shoes described above. The web 77 is provided with extensions 91 and 92 engageable with the bottom of the slot in the anchor pin 88 which limit the radial movement of the shoe inwardly or outwardly. A return spring 93 is connected between shoes 75 and 76 which also moves the piston 80 into the fluid motor following each operation thereof. The operation of this device is identical with that of the forward braking operation set forth above. Since a two-shoe brake is illustrated, it is provided with an identical construction on the diametric undisclosed side of the backing plate.

What I claim is:

1. A brake mechanism comprising a backing plate, a plurality of brake shoes mounted on said backing plate and engageable with a brake drum, each shoe having an abutment surface thereon, a fluid motor disposed between the ends of each of said brake shoes for moving said shoes into contact with the drum, an anchor bracket mounted on said backing plate in operative relation to each fluid motor; and an anchor pin rotatably mounted in each anchor bracket adapted to be rotated by the cooperating shoe when moved relative to the brake drum and having a slot therein forming an abutment surface engageable with the abutment surface on said shoe.

2. A brake mechanism comprising a backing plate, a plurality of brake shoes mounted on said backing plate and engageable with a brake drum, each shoe having an abutment surface thereon, a fluid motor disposed between the ends of each of said brake shoes for moving the shoes into engagement with the drum, an anchor bracket mounted on said backing plate adjacent each fluid motor, means rotatably mounted on each bracket for adjusting the associated shoe with respect to said drum; and an anchor pin rotatably mounted on each bracket and having a slot therein forming an abutment surface engageable with the abutment surface on said shoes when said fluid motors move the shoes into engagement with the drum.

3. A brake mechanism comprising a backing plate, a plurality of brake shoes mounted on said backing plate, each shoe having an abutment surface thereon, a fluid motor mounted between the ends of each of said shoes, an anchor bracket mounted on said backing plate adjacent each of said fluid motors; and an anchor pin rotatably mounted in each of said anchor brackets and provided with an abutment surface adapted for engagement with the abutment surface on said cooperating shoe for rotating said pin upon actuation of said cooperating shoe, said abutment surfaces preventing rotation of said shoes relative to said pins, said abutment surface on said shoe substantially intersecting the rotational axis of said anchor pin.

4. A brake mechanism comprising a backing plate secured to a vehicle member, a plurality of brake shoes mounted on said backing plate, each shoe provided with an abutment surface, a fluid motor disposed between the ends of each of said brake shoes, anchor brackets mounted on said backing plate and secured to the vehicle member mounting said backing plate, an anchor pin rotatably mounted in each of said brackets and having an abutment surface thereon engageable with the abutment surface of said shoe for preventing relative rotation of the anchor pin and shoe when the shoes are in engagement with the brake drum, said pin rotating with said shoe when pivoted by said fluid motor relative to the backing plate, said anchor bracket transmitting brake thrust directly to the vehicle member.

5. A brake mechanism comprising a backing plate secured to a vehicle member, a plurality of brake shoes mounted on said backing plate for engagement with a brake drum, each shoe provided with an abutment surface, a fluid motor disposed between the ends of each of the brake shoes, an anchor bracket mounted on said backing plate adjacent each fluid motor and secured to a vehicle member mounting said backing plate; and an anchor pin rotatably mounted in each bracket having an abutment surface thereon engageable with the abutment surface on said shoe for causing the pins to rotate when the shoes are actuated by said motors and for preventing relative rotation between the shoes and the anchor pin, said surfaces allowing said shoes to be moved radially of said backing plate when being centered relative thereto.

6. A brake mechanism comprising a backing plate, a plurality of brake shoes mounted on said backing plate, each shoe provided with an abutment surface, a fluid motor disposed between the ends of each of said brake shoes; and an anchor pin supported for rotation on said backing plate and having an abutment surface thereon engageable with the abutment surface on said shoe for causing the pins to rotate when the fluid motors actuate said shoes into engagement with a brake drum.

7. A brake mechanism comprising a backing plate, a plurality of brake shoes mounted on said backing plate and engageable with a brake drum, each shoe provided with an abutment surface, a fluid motor disposed between the ends of each of said brake shoes, means for supporting an anchor pin adjacent each of said fluid motors; and an anchor pin in each supporting means provided with an abutment surface adapted for direct engagement with the abutment surface on the cooperating shoes, said surfaces causing the pins to rotate as said cooperating shoes are actuated by the fluid motors and for permitting sliding motion between said shoes and pins when the shoes are centered relative to said backing plate, said abutment surface on said shoe substantially intersecting the rotational axis of said anchor pin.

8. A brake mechanism comprising a backing plate, a plurality of brake shoes mounted on said backing plate engageable with a brake drum and having an abutment surface thereon, a fluid motor disposed between the ends of each of said shoes, an anchor pin supporting means mounted on said backing plate adjacent each of said motors, a rotatable anchor pin in each means and having an abutment surface directly engageable with the abutment surface of said shoes, said abutment surfaces permitting said shoes to self-center after each adjustment when actuated by said fluid motors, said abutment surface on said shoe extending radially and intersecting the rotational axis of said anchor pin.

9. A brake mechanism comprising a backing plate, a plurality of brake shoes mounted on said backing plate and engageable with a brake drum, each shoe provided with an abutment surface, a fluid motor disposed between the ends of each of said brake shoes for moving said shoes into contact with the drum, an anchor bracket mounted on said backing plate in operative relation to each fluid motor; an anchor pin rotatably mounted in each anchor bracket and having a slot therein forming an abutment surface directly engageable with the abutment surface on said shoe, said abutment surface on said shoe substantially intersecting the rotational axis of said anchor pin.

10. A brake mechanism comprising a backing plate, a plurality of brake shoes mounted on said backing plate and engageable with a brake drum, each shoe having an abutment surface thereon, a fluid motor disposed between the ends of each of said brake shoes for moving the shoes into engagement with the drum, an anchor bracket mounted on said backing plate adjacent each fluid motor, and an anchor pin rotatably mounted on each bracket and having a slot therein forming an abutment surface directly engageable with the abutment surface on said shoes when said fluid motors move the shoes into engagement with the drum, said abutment surface on said shoe substantially intersecting the rotational axis of said anchor pin.

11. A brake mechanism comprising a backing plate, a plurality of brake shoes mounted on said backing plate, each shoe provided with an abutment surface, a fluid motor disposed between the ends of each of said brake shoes, an anchor pin supported for rotation on said backing plate and having an abutment surface thereon engageable with the abutment surface on said shoe for causing the pins to rotate when the fluid motors actuate said shoes into engagement with a brake drum; and means on each shoe for limiting the inward and outward radial movement of each shoe.

12. A brake mechanism comprising a backing plate, a plurality of brake shoes mounted on said backing plate and engageable with a brake drum, each shoe provided with an abutment surface, a fluid motor disposed between the ends of each of said brake shoes, means for supporting an anchor pin adjacent each of said fluid motors, an anchor pin in each supporting means provided with an abutment surface adapted for engagement with the abutment surface on the cooperating shoes, said surfaces causing the pins to rotate as said cooperating shoes are actuated by the fluid motors and for permitting sliding motion between said shoes and pins when the shoes are centered relative to said backing plate; and an extension on each end of said abutment surface for limiting the inward and outward radial movement of the shoes.

13. A brake mechanism comprising a backing plate, a plurality of brake shoes mounted on said backing plate, a fluid motor disposed between the ends of said brake shoes for moving the shoes into engagement with a brake drum; rotatable anchor pins supported by said backing plate to be directly engaged by said shoes, and rotated thereby when the shoes are moved relative to the brake drum.

14. A brake mechanism comprising a backing plate, a plurality of brake shoes mounted on said backing plate, a fluid motor disposed between the ends of each brake shoe for moving said shoes into engagement with a brake drum; and anchor pins rotatably supported on said backing plate operatively associated with said shoes for receiving the braking torque thereof and rotatable by said shoes when moved relative to the backing plate.

15. A brake mechanism comprising a backing plate, a plurality of brake shoes mounted on said backing plate, each shoe provided with an abutment surface, a fluid motor disposed between the ends of said brake shoes for moving said shoes into engagement with a brake drum; and an anchor pin supported on said backing plate adjacent the end of the shoe having an abutment surface, each pin having an abutment surface thereon directly engageable with said shoe abutment surface causing said pin to rotate as the cooperating shoe is actuated relative to said brake drum.

16. A brake mechanism comprising a backing plate, a plurality of shoes mounted thereon, means for moving each shoe into contact with a brake drum, means mounted on said backing plate for transmitting braking torque to a structural member on the vehicle mounting said brake mechanism, rotatable anchor pins associated with said means and on which said shoes are pivoted.

17. A brake mechanism comprising a backing plate, a pair of brackets mounted on said backing plate, a rotatable anchor pin in each bracket, a brake shoe engageable with each anchor pin for centering said shoes with respect to the brake drum; and a fluid motor for actuating each shoe into engagement with a brake drum, said brake shoes rotating said pins when said shoes are moved relative to the brake drum but moving relative to said pins when the shoes are centered relative to the drum.

References Cited in the file of this patent

UNITED STATES PATENTS

| | | |
|---|---|---|
| 2,146,009 | Chase | Feb. 7, 1939 |
| 2,156,794 | Schnell | May 2, 1939 |
| 2,206,030 | Dick | July 2, 1940 |
| 2,208,293 | Hayes et al. | July 16, 1940 |
| 2,218,201 | Lapwood | Oct. 15, 1940 |
| 2,331,349 | Schnell | Oct. 2, 1943 |
| 2,398,717 | Owens | Apr. 16, 1946 |
| 2,495,074 | Mossey | Jan. 17, 1950 |
| 2,516,995 | House | Aug. 1, 1950 |

FOREIGN PATENTS

| | | |
|---|---|---|
| 99,518 | Sweden | July 30, 1940 |
| 563,969 | Great Britain | Sept. 7, 1944 |
| 632,701 | Great Britain | Nov. 28, 1949 |